(12) United States Patent
Zhang et al.

(10) Patent No.: US 9,369,903 B2
(45) Date of Patent: *Jun. 14, 2016

(54) SYSTEM AND METHOD FOR MULTIPLEXING ON AN LTE UPLINK CONTROL CHANNEL

(75) Inventors: Jianzhong Zhang, Irving, TX (US); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,236

(22) Filed: Sep. 4, 2012

(65) Prior Publication Data

US 2012/0327861 A1 Dec. 27, 2012
US 2016/0021559 A9 Jan. 21, 2016

Related U.S. Application Data

(63) Continuation of application No. 12/284,822, filed on Sep. 25, 2008, now Pat. No. 8,259,651.

(60) Provisional application No. 61/064,765, filed on Mar. 25, 2008.

(51) Int. Cl.
*H04W 72/12* (2009.01)
*H04W 24/10* (2009.01)
(Continued)

(52) U.S. Cl.
CPC ............. *H04W 24/10* (2013.01); *H04L 1/0026* (2013.01); *H04L 1/0027* (2013.01); *H04L 1/0028* (2013.01); *H04L 1/1671* (2013.01); *H04L 5/0057* (2013.01); *H04L 5/0094* (2013.01);
(Continued)

(58) Field of Classification Search
None
See application file for complete search history.

(56) References Cited

U.S. PATENT DOCUMENTS

| 7,133,688 B2 | 11/2006 | Das et al. |
| 2004/0203980 A1 | 10/2004 | Das et al. |

(Continued)

FOREIGN PATENT DOCUMENTS

| CN | 101111083 A | 1/2008 |
| CN | 101981869 A | 2/2011 |

(Continued)

OTHER PUBLICATIONS

Translated Chinese Office Action dated Dec. 27, 2012 in connection with Chinese Application No. 200980110508.4; 12 pages.

(Continued)

*Primary Examiner* — Rhonda Murphy

(57) ABSTRACT

A wireless communication network comprising a plurality of base stations capable of wireless communication with a plurality of subscriber stations within a coverage area of the network, wherein at least one of the plurality of base stations is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with a WB CQI/PMI feedback report and a RI report on the physical uplink control channel according to the multiplexing scheme.

20 Claims, 7 Drawing Sheets

(51) Int. Cl.
*H04L 1/00* (2006.01)
*H04L 1/16* (2006.01)
*H04L 25/03* (2006.01)
*H04W 72/04* (2009.01)
*H04L 5/00* (2006.01)

(52) U.S. Cl.
CPC ..... *H04L 25/03343* (2013.01); *H04W 72/0453* (2013.01); *H04L 5/006* (2013.01); *H04L 5/0023* (2013.01); *H04L 2025/03426* (2013.01); *H04L 2025/03802* (2013.01)

(56) References Cited

U.S. PATENT DOCUMENTS

| | | | |
|---|---|---|---|
| 2007/0030839 | A1 | 2/2007 | Vimpari et al. |
| 2007/0121636 | A1 | 5/2007 | Kim et al. |
| 2007/0242770 | A1 | 10/2007 | Kim et al. |
| 2008/0219370 | A1 | 9/2008 | Onggosanusi et al. |
| 2009/0207784 | A1 | 8/2009 | Lee et al. |
| 2010/0183086 | A1 | 7/2010 | Ko et al. |
| 2012/0327861 | A1 | 12/2012 | Zhang et al. |
| 2014/0226518 | A1* | 8/2014 | Onggosanusi et al. ....... 370/252 |

FOREIGN PATENT DOCUMENTS

| | | |
|---|---|---|
| EP | 1 533 966 A2 | 5/2005 |
| EP | 1 575 234 A2 | 9/2005 |
| EP | 1 750 407 A1 | 2/2007 |
| KR | 20070050579 A | 5/2007 |
| RU | 2 272 357 C2 | 3/2006 |
| RU | 2 289 210 C2 | 12/2006 |

OTHER PUBLICATIONS

Translated Japanese Office Action dated Aug. 12, 2013 in connection with Japanese Application No. 2011-501715; 11 pages.

3GPP TSG-RAN WG1 Meeting #52; "Frequency-selective CQI report on PUCCH for SU-MIMO"; R1-080754; Feb. 11-15, 2008, Sorrento, Italy; 3 pages.

GPP TSG RAN WG1 Meeting #52; "Summary of AH on AI 6.3.4 "UE Procedures for downlink shared channel"; R1-081137; Feb. 11-15, 2008, Sorrento, Italy; 7 pages.

3GPP TS 36.213 V8.2.0; "Evolved Universal Terrestrial Radio Access (E-UTRA) Physical layer procedures"; Release 8; Mar. 20, 2008; 31 pages.

Translated Russian Decision on Grant in connection with Russian Application No. 2010143419/07(062477) dated May 31, 2012; 15 pages.

"CQI report formats", Samsung, 3GPP TSG-RAN Working Group 1 #52, Feb. 11-15, 2008, 5 pages.

European Search Report dated Sep. 28, 2011 in connection with European Patent Application No. EP 09 72 4075.

"Separate Rank and CQI Feedback in PUCCH", Texas Instruments, 3GPP TSG RAN WG1 #52, Feb. 11-15, 2008, 8 pages.

"3rd Generation Partnership Project; Technical Specification Group Radio Access Network; Evolved Universal Terrestrial Radio Access (E-UTRA); Physical layer procedures (Release 8)", 3GPP TS 36.213 v8.2.0, Mar. 2008, 31 pages.

Japanese Office action dated Jun. 24, 2014 in connection with Japanese Patent Application No. 2011-501715; 5 pgs.

3GPP TSG-RAN WG1; Frequency-Selective CQI on PUCCH; Meeting #51bis; R1-080149; Panasonic; Jan. 14-18, 2008; 10 pp.

U.S. Appl. No. 61/038,869 filed Mar. 24, 2008; 20 pgs.

Translated Korean Examination Report dated Feb. 24, 2015 in connection with Korean Patent Application No. 10-2010-7023719; 9 pgs.

3GPP TSG-RAN WG1 Meeting #52; Update of TS36.213 according to changes listed in cover sheet; R1-081158; Sorrento, Italy,Feb. 11-15, 2008; 29 pages.

Translated Chinese Office Action dated Oct. 10, 2015 in connection with Chinese Patent Application No. 2013103541391; 9 pgs.

* cited by examiner

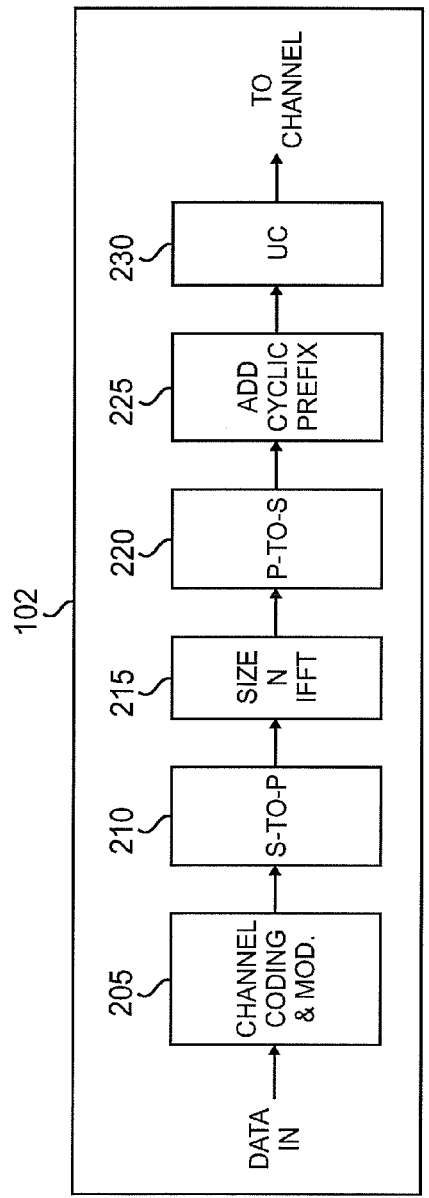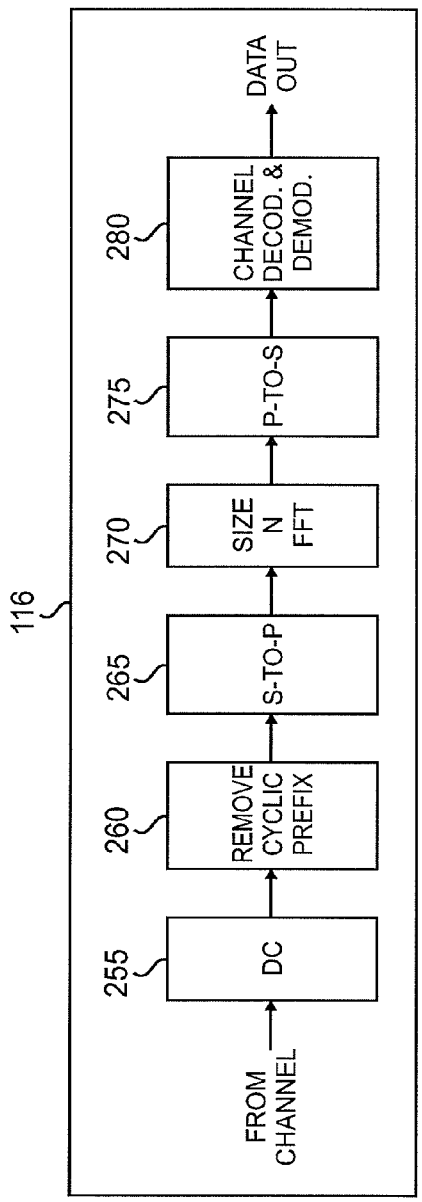

SYSTEM AND METHOD FOR MULTIPLEXING ON AN LTE UPLINK CONTROL CHANNEL

CROSS-REFERENCE TO RELATED APPLICATION(S) AND CLAIM OF PRIORITY

The present application is a continuation of U.S. Non-Provisional patent application Ser. No. 12/284,822 filed Sep. 25, 2008, now U.S. Pat. No. 8,259,651. U.S. Non-Provisional patent application Ser. No. 12/284,822 claims priority to U.S. Provisional Patent Application No. 61/064,765 filed Mar. 25, 2008. The present application claims the benefit, through co-pendency with U.S. Non-Provisional patent application Ser. No. 12/284,822, of the filing date of U.S. Provisional Patent Application No. 61/064,765.

TECHNICAL FIELD OF THE INVENTION

The present application relates generally to wireless communications and, more specifically, to a technique for multiplexing on a long term evolution (LTE) uplink control channel.

BACKGROUND OF THE INVENTION

Recently, the multiplexing of a rank information (RI) feedback report with a wideband channel quality information/precoding matrix index (WB CQI/PMI) feedback report on a physical uplink control channel (PUCCH) has been proposed. One proposed method of multiplexing the RI report with the WB CQI/PMI report on a PUCCH involves allowing different offsets between the RI and the WB CQI/PMI reports while keeping the period of the RI report as an integer multiple of the WB CQI/PMI report. This method would drop the WB CQI/PMI report if a collision occurs between the WB CQI/PMI and RI reports, and the most recently transmitted RI report on the PUCCH would be used by a user equipment (UE) (or subscriber station) to calculate the WB CQI/PMI reported on the configured resource on the PUCCH.

In this method, a Node-B (or base station) configures a single CQI reporting resource for either a RI report or a WB CQI/PMI report for each UE during each reporting instance. A reporting instance refers to a sub-frame where a report is performed. This method does not transmit the RI report and the WB CQI/PMI in the same reporting instance. Rather, only the RI is reported instead of the WB CQI/PMI in every M-th CQI reporting instance according to a higher layer configuration, and the WB CQI/PMI is reported in the remaining CQI reporting instances.

FIG. 3 illustrates an example of CQI reporting instances 300. In this example, M=4 and the offset between the RI report and the WB CQI/PMI is −1. Accordingly, WB CQI/PMI reports 302 occur in reporting instances 1-3 and 5-7 with RI reports 304 occurring in reporting instances 0 and 4 or every $4^{th}$ (or M-th) reporting instance.

Another proposed method configures the periods of and the offset between the RI and the WB CQI/PMI reports independently. This method also would drop the WB CQI/PMI report if a collision occurs between the WB CQI/PMI report and the RI report.

Similar methods may be used for multiplexing frequency-selective (FS) CQI/PMI and RI reports on a PUCCH.

Therefore, there is a need in the art for an improved system and method for multiplexing WB CQI/PMI, FS CQI/PMI and RI reports on a PUCCH. In particular, there is a need for a comprehensive solution for multiplexing WB CQI/PMI reports with FS CQI/PMI reports as well as RI reports on a PUCCH.

SUMMARY OF THE INVENTION

A wireless communication network comprising a plurality of base stations capable of wireless communication with a plurality of subscriber stations within a coverage area of the network, wherein at least one of the plurality of base stations is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with a WB CQI/PMI feedback report and a RI report on the physical uplink control channel according to the multiplexing scheme A base station capable of wireless communication with a plurality of subscriber stations within a coverage area of a network, where the base station is capable of: determining a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; transmitting the multiplexing scheme to a subscriber station; and receiving, from the subscriber station, an FS CQI/PMI feedback report multiplexed with an WB CQI/PMI feedback report and an RI report on the physical uplink control channel according to the multiplexing scheme.

A mobile station capable of communicating with a wireless network having a base station, where the mobile station: is operable to receive, from the base station, a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel; and is operable to transmit on the physical uplink control channel an FS CQI/PMI feedback report, a WB CQI/PMI feedback report and a rank information (RI) report multiplexed according to the received multiplexing scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A is a high-level diagram of an OFDMA transmitter according to one embodiment of the present disclosure;

FIG. 2B is a high-level diagram of an OFDMA receiver according to one embodiment of the present disclosure;

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
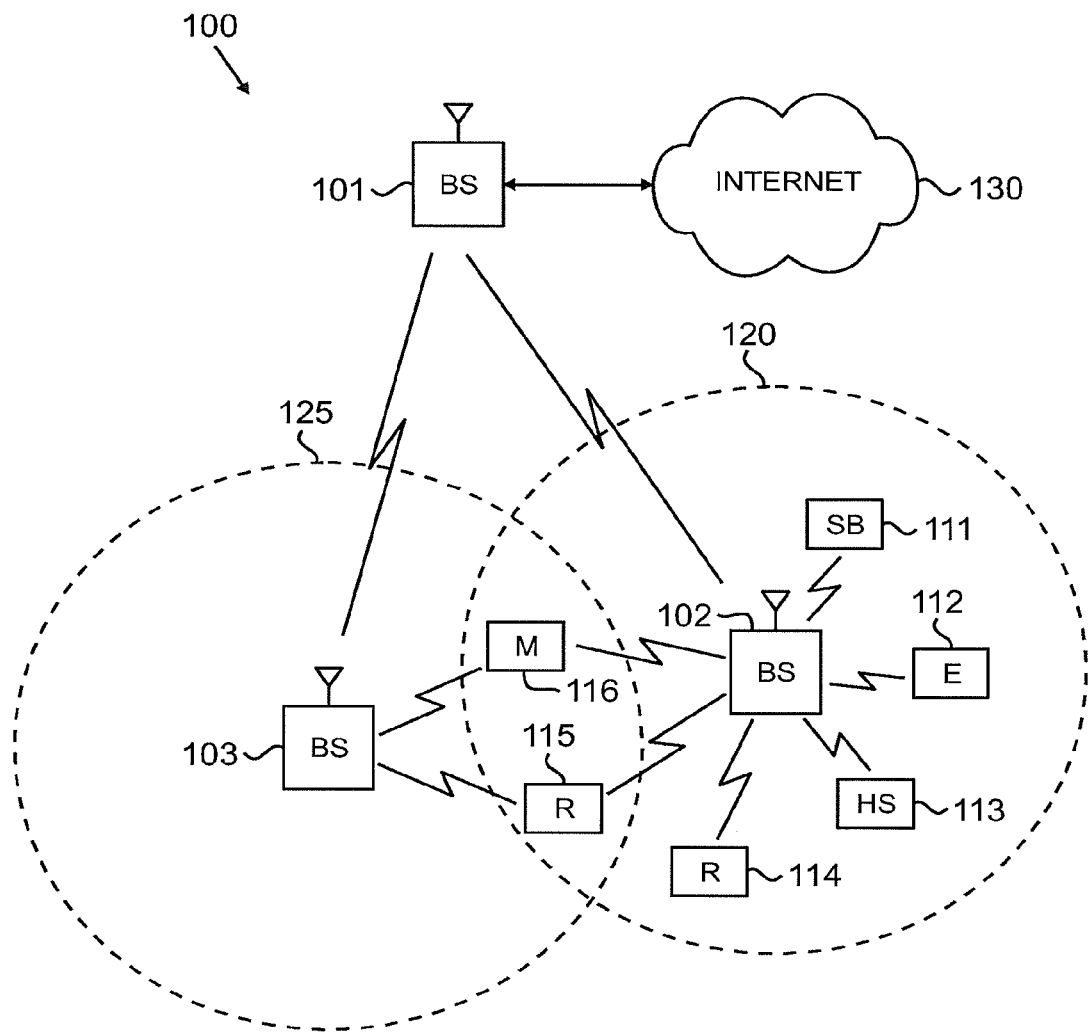
FIG. 1 illustrates an exemplary wireless network that transmits ACK/NACK messages in the uplink according to the principles of the present disclosure.
Figure 3:
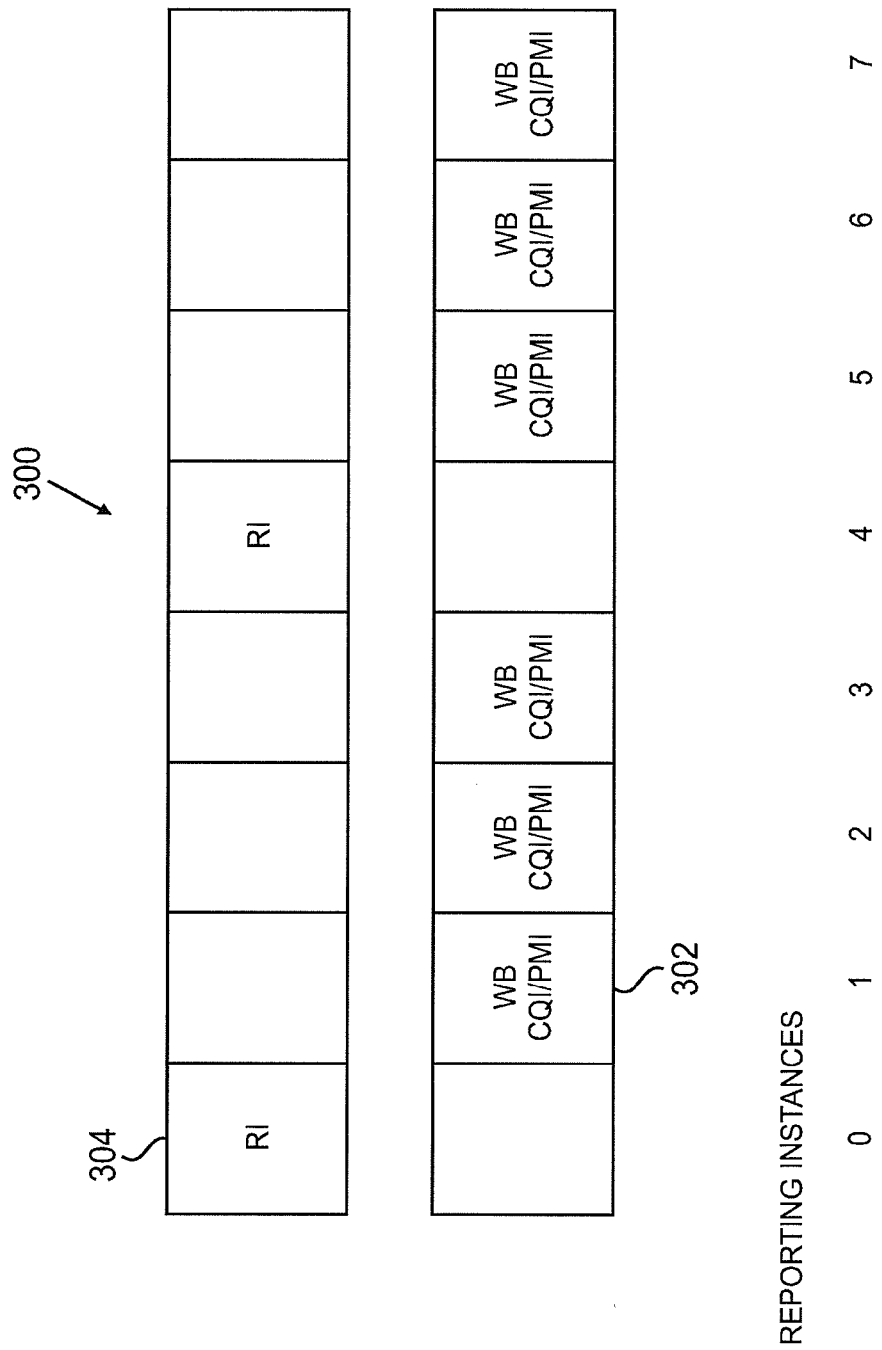
FIG. 3 illustrates an example of CQI reporting instances.

FIG. 1 illustrates exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for multiplexing wideband (WB) CQI/PMI reports with frequency-selective (FS) CQI/PMI reports as well as RI reports on a PUCCH.

According to a first method of the present disclosure, a Node-B configures a single CQI reporting resource for either a WB CQI/PMI report or an FS CQI/PMI report during each reporting instance. The period of the WB CQI/PMI report and the FS CQI/PMI report may be, for example, every P sub-frame. The WB CQI/PMI report and the FS CQI/PMI report are not submitted in the same reporting instance or sub-frame. Instead, the WB CQI/PMI is reported alone instead of the FS CQI/PMI in every L-th CQI reporting instance according to a higher layer configuration. Accordingly, the WB CQI/PMI reporting period is every L*P sub-frame with the FS CQI/PMI reported in the remaining CQI reporting instances.

In addition, the Node-B can configure another CQI reporting instance for RI reporting for each UE. The period of the RI reporting is M times that of the FS CQI/PMI reporting or every M*P sub-frames. An offset (typically between 0 to L*P−1 sub-frames) is allowed between RI and the WB CQI/PMI reporting. If a collision occurs between the RI report and either the WB CQI/PMI or FS CQI/PMI reports, the WB CQI/PMI or FS CQI/PMI report is dropped.

In one embodiment, the parameters P, L, and M are configured by a higher layer message, such as a radio resource control (RRC) message, in a semi-static manner.

Figure 4:
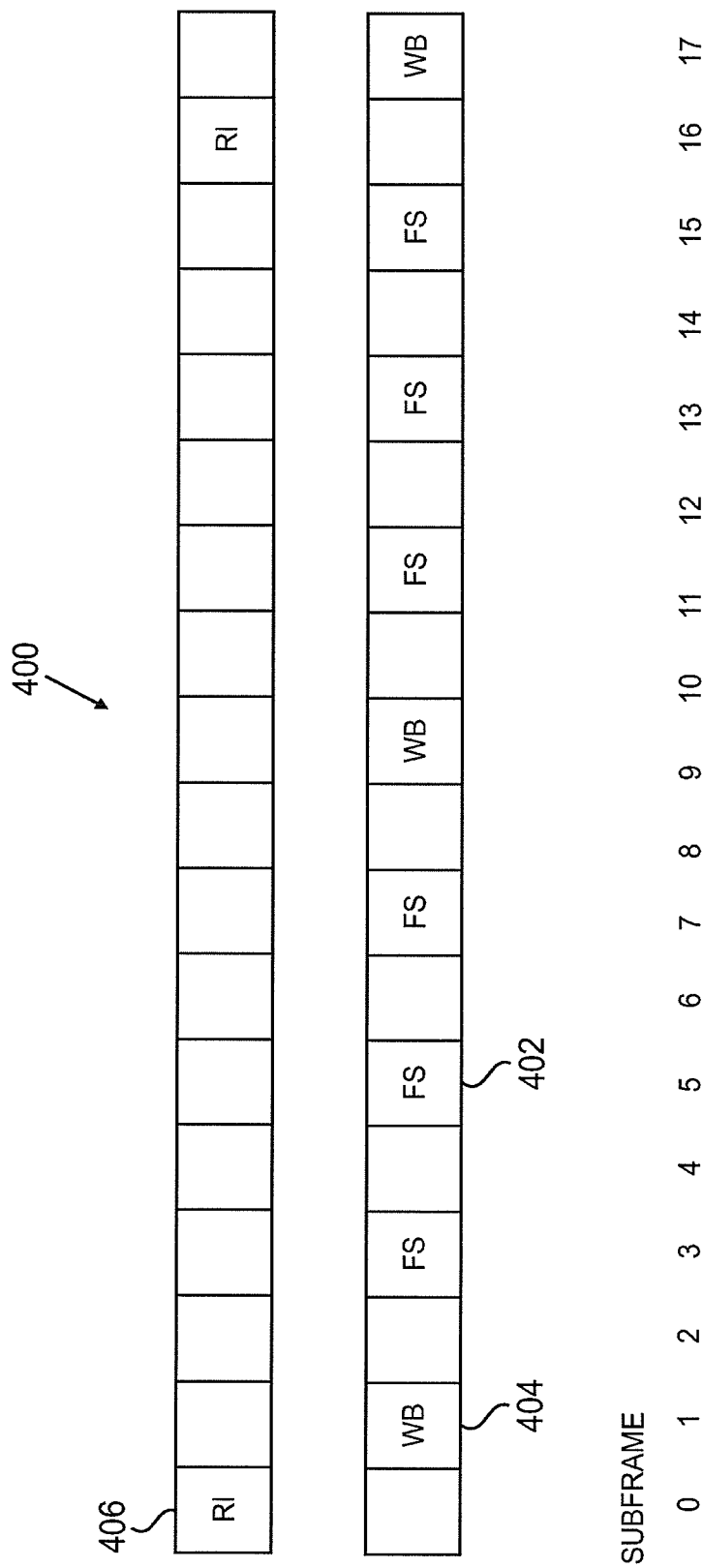
FIG. 4 illustrates an example of CQI reporting instances according to an embodiment of the present disclosure.

FIG. 4 illustrates an example of CQI reporting instances 400 according to an embodiment of the present disclosure. In this example, P=2, L=4, M=8 and the offset between the RI and WB CQI/PMI reports is −1. FS or WB CQI/PMI reports occur in every $2^{nd}$ (or P-th) sub-frame. Specifically, FS CQI/PMI reports 402 occur in sub-frames 3, 5, 7, 11, 13, and 15. WB CQI/PMI reports 404 occur in sub-frames 1, 9 and 17 (every $8^{th}$ or M-th sub-frame). RI reports 406 occur in sub-frames 0 and 16 (every $16^{th}$ or M*P-th sub-frame).

According to a second method of the present disclosure, the WB CQI/PMI report is jointed transmitted with rank bits in the same sub-frame, and the FS CQI/PMI report is transmitted in the remaining CQI reporting instances.

In addition, the Node-B transmits the RI reporting together with some or all of the WB CQI/PMI feedback reports. The RI reporting period is an integer multiple of the WB CQI/PMI feedback reporting period and is denoted by every K*L*P sub-frames. In this embodiment, P represents the reporting period of the FS CQI/PMI report, and L*P represents the reporting period of the WB CQI/PMI report. Rank bits are reported on the sub-frames where the WB CQI/PMI report exists. However, as shown in FIG. 5, not all WB CQI/PMI reporting sub-frames include RI.

Figure 5:
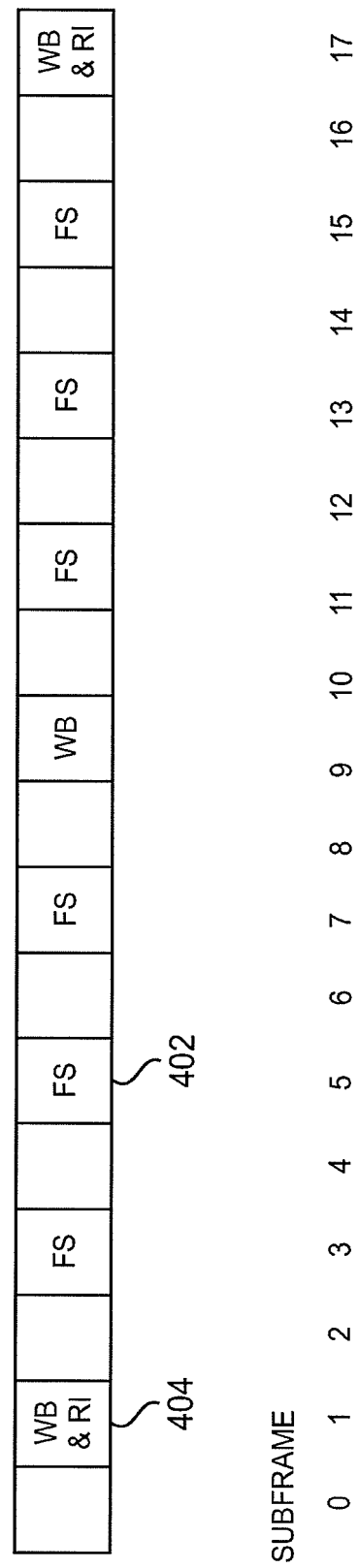
FIG. 5 illustrates an example of CQI reporting instances according to another embodiment of the present disclosure.

FIG. 5 illustrates an example of CQI reporting instances 500 according to another embodiment of the present disclosure. In this, example, P=2, L=4, and K=2. FS or WB CQI/PMI reports occur in every $2^{nd}$ (or P-th) sub-frame. Specifically, FS CQI/PMI reports 502 occur in sub-frames 3, 5, 7, 11, 13, and 15. WB CQI/PMI reports 504 occur in sub-frames 1, 9 and 17 (every $8^{th}$ or L*P-th sub-frame). RI reports are jointed transmitted with the WB CQI/PMI reports in sub-frames 1 and 17 (every $16^{th}$ or K*L*P-th sub-frame). In this example, the WB CQI/PMI reporting sub-frame 9 does not include RI.

In one example, for the sub-frames in which WB CQI/PMI reporting is jointly coded with RI, formats 2, 2a, and 2b defined in 3GGP specification 36.212[2] are used. In this example, format 2 is used when the joint WB CQI/PMI and RI report is not multiplexed with ACK/NACK (acknowledged/not acknowledged) bits. Format 2a/2b is used when joint WB CQI/PMI and RI report is multiplexed with ACK/NACK bits for a short cyclic prefix. Format 2 is used when joint WB CQI/PMI and RI report is multiplexed with ACK/NAK bits for a long cyclic prefix.

Table 1 illustrates an example of a payload size for the jointly coded RI and WB CQI/PMI reports in a case of closed-loop spatial multiplexing in a PUCCH.

TABLE 1

| | (closed-loop spatial multiplexing) | | | |
| --- | --- | --- | --- | --- |
| | 2-Tx | | 4-Tx | |
| Field | Rank = 1 | Rank = 2 | Rank = 1 | Rank > 1 |
| Wideband CQI | 4 | 7 (4 + 3) | 4 | 7 (4 + 3) |
| Wideband PMI | [2 or 3] | [1 or 2] | 4 | 4 |
| RI | 1 | 1 | 2 | 2 |
| Total | 7 or 8 | 9 or 10 | 10 | 13 |

Table 2 illustrates an example of a payload size for the jointly coded RI and WB CQI/PMI reports in a case of open-loop spatial multiplexing in a PUCCH.

TABLE 2

| | (open-loop spatial multiplexing) | | | |
|---|---|---|---|---|
| | 2-Tx | | 4-Tx | |
| Field | Rank = 1 | Rank = 2 | Rank = 1 | Rank > 1 |
| Wideband CQI | 4 | 4 | 4 | 4 |
| Wideband PMI | — | — | — | — |
| RI | 1 | 1 | 2 | 2 |
| Total | 5 | 5 | 6 | 6 |

In the case in which the WB CQI/PMI and RI report is not multiplexed with ACK/NACK bits for a short (normal) cyclic prefix case, in one example, the rank information sub-code is multiplexed with the WB CQI/PMI bits to form a linear block code of jointly coded RI sub-code and WB CQI/PMI bits as defined by Table 5.2.3.3-1 in 3GGP specification 36.212[2], which provide better protection for the RI sub-code compared to the WB CQI/PMI bits.

In the case in which the WB CQI/PMI and RI report is multiplexed with ACK/NACK bits for an extended cyclic case, in one example, the rank information subcode is multiplexed with ACK/NACK sub-code as well as the WB CQI/PMI bits to form a linear block code of jointly coded RI subcode and WB CQI/PMI bits as defined by Table 5.2.3.3-1 in 3GGP specification 36.212[2].

According to one example (assuming that the number of coded bits after the RI sub-code is $Q_{RI}$), if there is only one rank bit, denoted by $O_0^{RI}$, then the rank bit is repeated $Q_{RI}$ time to form the codeword. If there are two rank bits (denoted by $[O_1^{RI}O_0^{RI}]$), the two rank bits are simply repeated $\lfloor Q_{RI}/2 \rfloor$ times to form the codeword. For example, if $Q_{RI}=4$, the codeword is given by $[O_1^{RI}O_0^{RI}O_1^{RI}O_0^{RI}]$. If $Q_{RI}$ is not an even number, the codeword is concatenated with $O_1^{RI}$ or $O_0^{RI}$.

To form the coded bits for the two rank bits $[O_1^{RI}O_0^{RI}]$, the two rank bits are mapped to a 3-bit codeword according to the simplex (3,2) code shown in Table 3 below.

TABLE 3

| component simplex (3, 2) code used for two rank bits. | |
|---|---|
| Two information bits (either A/N bits or rank bits) | Component codeword $c_1c_2c_3$ (Simplex (3, 2) codebook) |
| 00 | 000 |
| 01 | 011 |
| 10 | 101 |
| 11 | 110 |

The codeword is repeated $\lfloor Q_{RI}/3 \rfloor$ times, and the resulting sequence is concatenated with the first $Q_{RI}-3*\lfloor Q_{RI}/2 \rfloor$ bits in the codeword $c_1c_2c_3$. This concatenated bit sequence is the final coded bit sequence to be modulated and mapped into the channel sequence.

In another embodiment of the present disclosure, the Node-B uses a higher-layer signal to semi-statically configure a given UE to operate using either the first or second method mentioned above, for example, according to cell, antenna, and channel configurations.

In one example, if a UE is performing open-loop spatial multiplexing, the second method could be a more suitable choice as the total payload is at most 6 bits for the jointly coded WB CQI/PMI and RI reports. Therefore, the coverage of this joint report is not expected to be an issue while the savings in PUCCH resource is significant.

In another example, if a UE is performing closed-loop spatial multiplexing in extended cyclic prefix, the Node-B can configure the PUCCH report of the UE using the first method since the jointly coded WB CQI/PMI and RI reports will have a payload up to 13 bits. When combined with up to 2 ACK/NACK bits, the resulting payload will exceed the allowable payload supported by format 2 in extended cyclic prefix. Therefore, the second method would not be a good choice in this case.

Figure 6:
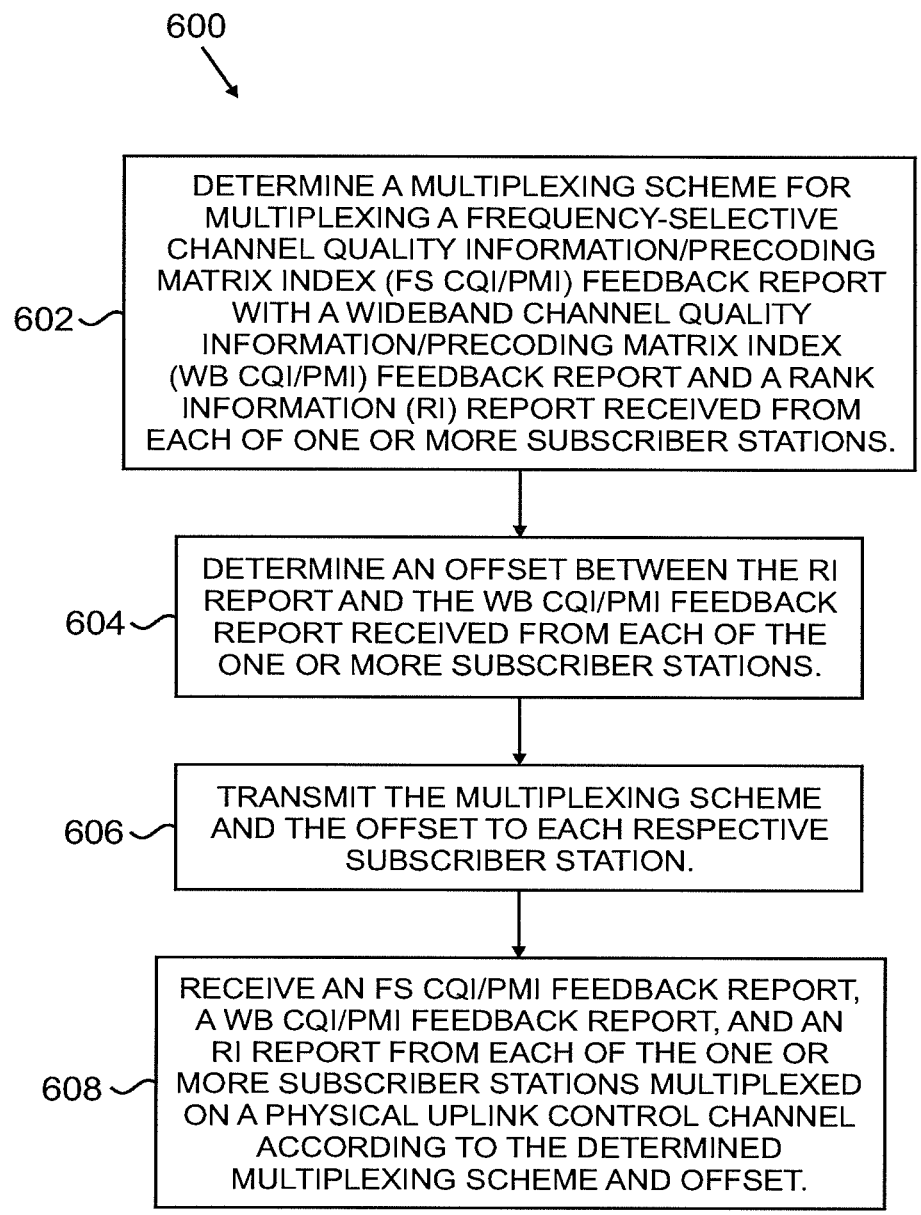
FIG. 6 illustrates a method of operating a base station according to an embodiment of the present disclosure.

FIG. 6 illustrates a method 600 of operating a base station according to an embodiment of the present disclosure. In step 602, the base station determines a multiplexing scheme for a frequency-selective channel quality information/precoding matrix index (FS CQI/PMI) feedback report with a wideband channel quality information/precoding matrix index (WB CQI/PMI) feedback report and a rank information (RI) report received from each of one or more subscriber stations. In step 604, the base station determines an offset between the RI report and the WB CQI/PMI feedback report received from each of the one or more subscriber stations. In step 606, the base station transmits the multiplexing scheme and the offset to each respective subscriber station. In step 606, the base station receives an FS CQI/PMI feedback report, a WB CQI/PMI feedback report, and an RI report from each of the one or more subscriber stations multiplexed on a physical uplink control channel according to the determined multiplexing scheme and offset. This step may include receiving the FS CQI/PMI feedback report and the WB CQI/PMI feedback report in different sub-frames of the physical uplink control channel. This step may further include receiving the FS CQI/PMI feedback report in every P-th sub-frame of a first set of sub-frames and reporting the WB CQI/PMI feedback report in stead of the FS CQI/PMI feedback report in every L*P-th sub-frame of the first set of sub-frames. In step 608, the base station proceeds to scheduling and link adaptation for each subscriber station based upon the received FS CQI/PMI feedback report, WB CQI/PMI feedback report, and RI report.

Figure 7:
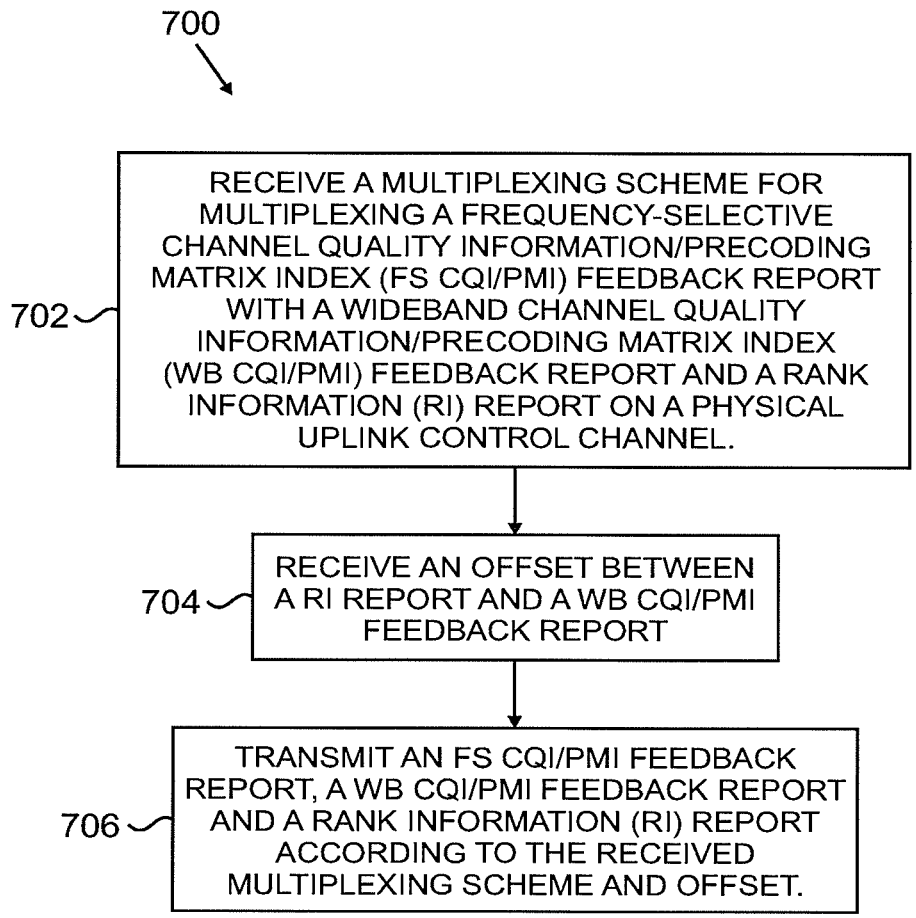
FIG. 7 illustrates a method of operating a subscriber station according to an embodiment of the present disclosure.

FIG. 7 illustrates a method 700 of operating a subscriber station according to an embodiment of the present disclosure. In step 702, a subscriber station receives a multiplexing scheme for multiplexing a frequency-selective channel quality information/precoding matrix index (FS CQI/PMI) feedback report with a wideband channel quality information/precoding matrix index (WB CQI/PMI) feedback report and a rank information (RI) report on a physical uplink control channel. In step 704, the subscriber station receives an offset between a RI report and a WB CQI/PMI feedback report. In step 706, the subscriber station transmits an FS CQI/PMI feedback report, a WB CQI/PMI feedback report and a rank information (RI) report according to the received multiplexing scheme and offset. This step may include transmitting the FS CQI/PMI feedback report and the WB CQI/PMI feedback report in different sub-frames of the physical uplink control channel. This step may further include transmitting the FS CQI/PMI feedback report in every P-th sub-frame of a first set of sub-frames and reporting the WB CQI/PMI feedback report in stead of the FS CQI/PMI feedback report in every L*P-th sub-frame of the first set of sub-frames.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for reporting channel information during periodic reporting instances by a mobile station in a communication system, the method comprising:

periodically transmitting wideband (WB) channel quality information during associated reporting instances, a period for transmitting the WB channel quality information being M times a period of the reporting instances;

transmitting frequency-selective (FS) channel quality information during at least one associated reporting instance between two consecutive WB channel quality information reporting instances; and periodically transmitting rank information (RI), a period for transmitting the RI being P times the period for transmitting WB channel quality information, wherein an offset is used to define the reporting instances for transmitting the RI and the WB channel quality information.

2. The method of claim 1, further comprising:
dropping transmission of the WB channel quality information or the FS channel quality information if a collision occurs between a RI reporting instance and a WB reporting instance or a FS reporting instance.

3. The method of claim 1, wherein the period for transmitting the RI, the period for transmitting the WB, and the period of the reporting instances are configured in part by a higher layer message in a semi-static manner.

4. The method of claim 1, wherein the offset is configured independently of the period for transmitting the RI.

5. The method of claim 1, wherein the offset specifies an integer number of reporting instances.

6. The method of claim 5, wherein the offset is a negative value.

7. The method of claim 1, wherein the WB channel quality information, the FS channel quality and the RI are reported on a physical uplink control channel.

8. A method in a base station for receiving channel information during periodic reporting instances from a mobile station in a communication system, the method comprising:
transmitting reporting configuration information to the mobile station, the reporting configuration information indicating
a period for periodically transmitting wideband (WB) channel quality information from the mobile station during associated reporting instances, the period for transmitting the WB channel quality information being M times a period of the reporting instances, wherein frequency-selective (FS) channel quality information is transmitted from the mobile station during at least one associated reporting instance between two consecutive WB channel quality information reporting instances,
a period for periodically transmitting rank information (RI) from the mobile station, the period for transmitting the RI being P times the period for transmitting WB channel quality information, and
an offset used to define the reporting instances for transmitting the RI and the WB channel quality information.

9. The method of claim 8, wherein transmission of the WB channel quality information or the FS channel quality information is dropped if a collision occurs between a RI reporting instance and a WB reporting instance or a FS reporting instance.

10. The method of claim 8, wherein the period for transmitting the RI, the period for transmitting the WB, and the period of the reporting instances are configured in part by a higher layer message in a semi-static manner.

11. The method of claim 8, wherein the offset is configured independently of the period for transmitting the RI.

12. The method of claim 8, wherein the offset specifies an integer number of reporting instances.

13. The method of claim 12, wherein the offset is a negative value.

14. The method of claim 8, wherein the WB channel quality information, the FS channel quality and the RI are reported on a physical uplink control channel.

15. A mobile station configured to report channel information during periodic reporting instances in a communication system, the mobile station comprising:
a transmitter configured to:
periodically transmit wideband (WB) channel quality information during associated reporting instances, a period for transmitting the WB channel quality information being M times a period of the reporting instances,
transmit frequency-selective (FS) channel quality information during at least one associated reporting instance between two consecutive WB channel quality information reporting instances, and
periodically transmit rank information (RI), a period for transmitting the RI being P times the period for transmitting WB channel quality information,
wherein an offset is used to define the reporting instances for transmitting the RI and the WB channel quality information.

16. The mobile station of claim 15, wherein the transmitter is configured to drop transmission of the WB channel quality information or the FS channel quality information if a collision occurs between a RI reporting instance and a WB reporting instance or a FS reporting instance.

17. The mobile station of claim 15, wherein the period for transmitting the RI, the period for transmitting the WB, and the period of the reporting instances are configured in part by a higher layer message in a semi-static manner.

18. The mobile station of claim 15, wherein the offset is configured independently of the period for transmitting the RI.

19. The mobile station of claim 15, wherein the offset specifies an integer number of reporting instances.

20. The method of claim 19, wherein the offset is a negative value.

* * * * *